US011921570B2

United States Patent
Perneti et al.

(10) Patent No.: US 11,921,570 B2
(45) Date of Patent: Mar. 5, 2024

(54) DEVICE FAILURE PREDICTION USING FILTER-BASED FEATURE SELECTION AND A CONFORMAL PREDICTION FRAMEWORK

(71) Applicant: Dell Products L.P., Round Rock, TX (US)

(72) Inventors: Jayanth Kumar Reddy Perneti, Bangalore (IN); Vindhya Gangaraju, Davanagere (IN)

(73) Assignee: Dell Products L.P., Round Rock, TX (US)

( * ) Notice: Subject to any disclaimer, the term of this patent is extended or adjusted under 35 U.S.C. 154(b) by 26 days.

(21) Appl. No.: 17/027,004

(22) Filed: Sep. 21, 2020

(65) Prior Publication Data
US 2022/0091915 A1     Mar. 24, 2022

(51) Int. Cl.
  *G06F 11/07*   (2006.01)
  *G06F 11/00*   (2006.01)
  *G06N 20/00*   (2019.01)

(52) U.S. Cl.
  CPC ......... *G06F 11/079* (2013.01); *G06F 11/008* (2013.01); *G06F 11/0709* (2013.01);
  (Continued)

(58) Field of Classification Search
  CPC ............... G06F 11/008; G06F 11/0793; G06F 11/0709; G06F 11/0727; G06F 11/0751; G06F 11/0781; G06F 11/079; G06N 20/00
  See application file for complete search history.

(56) References Cited

U.S. PATENT DOCUMENTS

2019/0297214 A1* 9/2019 Sonoda ............ H04N 1/00925
2019/0377625 A1* 12/2019 Chintalapati .......... G06N 7/005
(Continued)

FOREIGN PATENT DOCUMENTS

WO   WO-2019002603 A1 * 1/2019 ............. G06N 7/005

OTHER PUBLICATIONS

Shafer, Glen et al., A Tutorial on Conformal Prediction, Mar. 2008, Journal of Machine Learning Research, Retrieved from Internet <https://jmlr.csail.mit.edu/papers/volume9/shafer08a/shafer08a.pdf> (Year: 2008).*

(Continued)

*Primary Examiner* — Bryce P Bonzo
*Assistant Examiner* — Albert Li
(74) *Attorney, Agent, or Firm* — Ryan, Mason & Lewis, LLP

(57) ABSTRACT

An apparatus comprises a processing device configured to obtain monitoring data for devices comprising a plurality of features, determining two or more rankings of the features using two or more filter-based feature selection algorithms, and selecting a subset of the features based at least in part on the two or more rankings. The processing device is also configured to generate a failure prediction for a given one of the devices using at least one classifier that takes as input the selected subset of features, and applying a conformal prediction framework to the generated failure prediction to obtain a confidence measure indicating a quality of the generated failure prediction and a credibility measure indicating a quality of the monitoring data. The processing device is further configured to initiate one or more remedial actions based at least in part on the generated failure prediction, the confidence measure, and the credibility measure.

19 Claims, 16 Drawing Sheets

(52) U.S. Cl.
CPC ...... *G06F 11/0727* (2013.01); *G06F 11/0751* (2013.01); *G06F 11/0781* (2013.01); *G06F 11/0793* (2013.01); *G06N 20/00* (2019.01)

(56) References Cited

U.S. PATENT DOCUMENTS

2020/0133758 A1 4/2020 Liu et al.
2020/0250027 A1 8/2020 Dinh et al.

OTHER PUBLICATIONS

Vishwakarma, Rahul et al., Understanding the Reliability of Predictions Made by Machine Learning, uploaded to YouTube on Jul. 13, 2019 by user SNIAVideo, Presentation retrieved from Internet <https://www.youtube.com/watch?v=tc6hMLadl2s> (Year: 2019).*
Vishwakarma, Rahul et al., Understanding the Reliability of Predictions Made by Machine Learning, May 23-24, 2019, SNIA, Slides retrieved from Internet <https://www.snia.org/educational-library/understanding-reliability-predictions-made-machine-learning-2019> (Year: 2019).*
Xie, Xueshuo et al., Confidence guided anomaly detection model for anti-concept drift in dynamic logs, Apr. 14, 2020, Journal of Network and Computer Applications, Retrieved from Internet <https://doi.org/10.1016/j.jnca.2020.102659> (Year: 2020).*
Saghapour, Ehsan et al., A novel feature ranking method for prediction of cancer stages using proteomics data, Sep. 21, 2017, PLoS ONE, Retrieved from Internet <https://doi.org/10.1371/journal.pone.0184203> (Year: 2017).*
Ren, Yitong et al., System Log Detection Model Based on Conformal Prediction, Jan. 31, 2020, MDPI, Retrieved from Internet <https://doi.org/10.3390/electronics9020232> (Year: 2020).*
Xie, Xueshuo et al., A Confidence-Guided Evaluation for Log Parsers Inner Quality, Jan. 14, 2020, Mobile Networks and Applications, Retrieved from Internet <https://doi.org/10.1007/s11036-019-01501-6> (Year: 2020).*
Balasubramanian, Vineeth et al., Conformal Prediction for Reliable Machine Learning, Apr. 2014, Morgan Kaufmann, 1st Edition, Retrieved from Internet <https://learning.oreilly.com/library/view/conformal-prediction-for/9780123985378/> (Year: 2014).*
Merriam-Webster, Algorithm, Jul. 16, 2020, Merriam-Webster, Retrieved from The Wayback Machine: < https://web.archive.org/web/20200716192931/https://www.merriam-webster.com/dictionary/algorithm> (Year: 2020).*
Andrea Bommert et al., Benchmark for filter methods for feature selection in high-dimensional classification data, Computational Statistics & Data Analysis, vol. 143, 2020, 106839, ISSN 0167-9473, https://doi.org/10.1016/j.csda.2019.106839. (Year: 2020).*
A. Lambrou, H. Papadopoulos and A. Gammerman, "Evolutionary Conformal Prediction for Breast Cancer Diagnosis," 2009 9th International Conference on Information Technology and Applications in Biomedicine, 2009, pp. 1-4, doi: 10.1109/ITAB.2009.5394447. (Year: 2009).*
Junjie Qian, S. Skelton, J. Moore and Hong Jiang, "P3: Priority based proactive prediction for soon-to-fail disks," 2015 IEEE International Conference on Networking, Architecture and Storage (NAS), 2015, pp. 81-86, doi: 10.1109/NAS.2015.7255224. (Year: 2015).*
P. G. Jeba Leelipushpam and J. Sharmila, "Live VM migration techniques in cloud environment—A survey," 2013 IEEE Conference on Information & Communication Technologies, 2013, pp. 408-413, doi: 10.1109/CICT.2013.6558130. (Year: 2013).*
"How to display list items on console window in C#", 2009, StackOverflow, <https://stackoverflow.com/questions/759133/how-to-display-list-items-on-console-window-in-c-sharp> (Year: 2009).*
"Lists", 2019, W3C, <https://web.archive.org/web/20190811020155/https://www.w3.org/TR/html4/struct/lists.html> (Year: 2019).*
"Creating a Sorted Component", 2006, Oracle, <https://www.oracle.com/technical-resources/articles/javase/sorted-jlist.html> (Year: 2006).*
C. Xu, G. Wang, X. Liu, D. Guo and T. -Y. Liu, "Health Status Assessment and Failure Prediction for Hard Drives with Recurrent Neural Networks," in IEEE Transactions on Computers, vol. 65, No. 11, pp. 3502-3508, Nov. 1, 2016, doi: 10.1109/TC.2016.2538237. (Year: 2016).*
Vovk, V. Conditional validity of inductive conformal predictors. Mach Learn 92, 349-376 (2013). https://doi.org/10.1007/s10994-013-5355-6 (Year: 2013).*
Friedman, J, "MART", 2019, Statistical & Financial Consulting by Stanford PhD, <https://web.archive.org/web/20190714125625/https://stanfordphd.com/MART.html> (Year: 2019).*
Rekha Nachiappan et al., Cloud storage reliability for Big Data applications: A state of the art survey, Journal of Network and Computer Applications, vol. 97, 2017, https://doi.org/10.1016/j.jnca.2017.08.011. (Year: 2017).*
A. Ma et al., "RAIDShield: Characterizing, Monitoring, and Proactively Protecting Against Disk Failures," Proceedings of the 13th USENIX Conference on File and Storage Technologies, https://www.usenix.org/conference/fast15/technical-sessions/presentation/ma, Feb. 16-19, 2015, 17 pages.
F. Mahdisoltani et al., "Proactive Error Prediction to Improve Storage System Reliability," 2017 USENIX Annual Technical Conference, https://www.usenix.org/conference/atc17/technical-sessions/presentation/mahdisoltani, Jul. 12-14, 2017, 13 pages.
J. Li et al., "Hard Drive Failure Prediction Using Classification and Regression Trees," 2014 44th Annual IEEE/IFIP International Conference on Dependable Systems and Networks, Jun. 23-26, 2014, 12 pages.
V. Choinski et al., "The Economic Value of Data Domain and Integrated Data Protection Appliances (IDPA)," Enterprise Strategy Group Inc. White Paper, Jun. 2018, 11 pages.
Dell EMC, "Deduplication Solutions Are Not All Created Equal, Why Data Domain?" 2017, 12 pages.
Dell EMC, "Dell EMC Data Domain Operating System," Version 6.1, Administration Guide, 302-003-761, REV. 05, Feb. 2019, 556 pages.
Dell EMC, "Dell EMC DD OS," Version 7.1, Administration Guide, Revision 03, Mar. 2020, 456 pages.
R. Rahim et al., "TOPSIS Method Application for Decision Support System in Internal Control for Selecting Best Employees," 2nd International Conference on Statistics, Mathematics, Teaching, and Research, Journal of Physics: Conference Series, vol. 1028, 2018, 9 pages.

\* cited by examiner

```
Dataset from ASUP: 10.11.12.13 (root/Password)
[root@server DISKS_SAS]# ls -ltrh
-rw-r--r-- 1 root root 200G Jan 30 17:27 disks_sas.db
-rw-r--r-- 1 root root  20G Feb 16 10:47 DISK_DRIVE_MODEL_A_2014_2019.csv
```

| CLASSIFIER | | T-TEST | WRS | MIM | JMI | DISR |
|---|---|---|---|---|---|---|
| DT | MCC | 0.12±0.0012 | 0.07±0.002 | 0.1±0.0016 | 0.04±0.0014 | 0.01±0.0018 |
| | AUC | 52.11±0.31 | 50.62±0.51 | 55.16±0.39 | 49.17±0.34 | 50.82±0.44 |
| LDA | MCC | 0.13±0.0004 | 0.06±0.0002 | 0.19±0.0003 | 0.18±0.0003 | 0.15±0.0005 |
| | AUC | 50.96±0.08 | 52.23±0.04 | 51.69±0.06 | 51.71±0.07 | 48.61±0.1 |
| KNN | MCC | 0.11±0.0003 | 0.12±0.0006 | 0.13±0.0004 | 0.15±0.0006 | 0.11±0.0006 |
| | AUC | 54.52±0.12 | 55.99±0.16 | 55.5±0.1 | 53.25±0.13 | 55.23±0.15 |
| NB | MCC | 0.23±0.0002 | 0.26±0.0003 | 0.16±0.0005 | 0.16±0.0004 | 0.08±0.0005 |
| | AUC | 56.77±0.04 | 52.53±0.06 | 57.32±0.11 | 57.92±0.08 | 53.31±0.09 |
| SVM | MCC | 0.15±0.0007 | 0.14±0.0004 | 0.11±0.0005 | 0.16±0.0005 | 0.13±0.0011 |
| | AUC | 53.49±0.18 | 51.46±0.06 | 55.01±0.02 | 55.99±0.03 | 56.60±0.1 |
| RF | MCC | 0.24±0.0005 | 0.28±0.0005 | 0.21±0.0003 | 0.16±0.0006 | 0.13±0.0003 |
| | AUC | 57.98±0.09 | 55.51±0.13 | 56.73±0.07 | 54.43±0.14 | 55.93±0.07 |
| FL | MCC | -0.01±0.0019 | 0.02±0.0019 | 0.01±0.0018 | 0.01±0.0009 | 0±0.0023 |
| | AUC | 48.67±0.48 | 50.2±0.48 | 50.47±0.45 | 49.33±0.22 | 48.24±0.59 |

| CLASSIFIER | | CMIM | MRMR | MIFS | ICAP | CIFE | PS |
|---|---|---|---|---|---|---|---|
| DT | MCC | 0.08±0.0008 | 0.11±0.0018 | 0.13±0.0014 | 0.03±0.0018 | 0.13±0.0014 | 0.18±0.001 |
| | AUC | 51.77±0.21 | 50.03±0.45 | 48.37±0.35 | 50.69±0.46 | 50.51±0.36 | 59.05±0.24 |
| LDA | MCC | 0.21±0.0008 | 0.18±0.0004 | 0.23±0.0003 | 0.16±0.0005 | 0.18±0.0006 | 0.29±0.0004 |
| | AUC | 50.65±0.19 | 49.02±0.09 | 50.07±0.06 | 54.44±0.1 | 52.94±0.15 | 63.73±0.07 |
| KNN | MCC | 0.06±0.0004 | 0.16±0.0004 | 0.20±0.0006 | 0.12±0.0003 | 0.06±0.0005 | 0.27±0.0005 |
| | AUC | 53.12±0.1 | 56.2±0.09 | 52.49±0.15 | 55.08±0.07 | 52.81±0.13 | 62.08±0.12 |
| NB | MCC | 0.17±0.0005 | 0.21±0.0003 | 0.16±0.0004 | 0.21±0.0003 | 0.1±0.0003 | 0.34±0.0001 |
| | AUC | 51.17±0.12 | 51.43±0.06 | 54.97±0.08 | 57.99±0.07 | 50.62±0.07 | 66.94±0.03 |
| SVM | MCC | 0.1±0.0005 | 0.19±0.0007 | 0.17±0.0007 | 0.13±0.0003 | 0.14±0.0004 | 0.26±0.0007 |
| | AUC | 53.05±0.04 | 52.42±0.19 | 56.13±0.12 | 55.46±0.05 | 52.15±0.07 | 62.98±0.091 |
| RF | MCC | 0.17±0.0007 | 0.23±0.0004 | 0.17±0.0004 | 0.14±0.0007 | 0.16±0.0003 | 0.33±0.0003 |
| | AUC | 55.05±0.16 | 58.79±0.09 | 57.6±0.14 | 56.06±0.13 | 57.49±0.01 | 66.25±0.08 |
| FL | MCC | -0.01±0.0009 | -0.01±0.0018 | -0.01±0.0027 | 0.01±0.0029 | 0.01±0.0026 | 0.02±0.0024 |
| | AUC | 49.13±0.23 | 49.52±0.47 | 49.49±0.69 | 50.33±0.74 | 50.26±0.67 | 53.98±0.72 |

DEVICE FAILURE PREDICTION USING FILTER-BASED FEATURE SELECTION AND A CONFORMAL PREDICTION FRAMEWORK

FIELD

The field relates generally to information processing, and more particularly to storage in information processing systems.

BACKGROUND

Storage device failure detection is a problem across the storage industry. In some cases, failure of a storage device such as a disk drive results in data unavailability for users of the storage device until a backup is restored or otherwise made accessible. In other cases, failure of a storage device may result in permanent data loss. In both cases, there can be significant impacts on the users of the storage device. Such users may include, for example, operators of large-scale installations of storage systems including in data centers, cloud computing systems, etc. As the size and number of storage systems in such large-scale installations continues to grow, failure of storage devices utilized in the storage systems becomes the norm rather than the exception. Despite significant effort, ensuring reliability of storage devices remains a major challenge, including for storage devices that run or otherwise operate in large-scale enterprise storage systems.

SUMMARY

Illustrative embodiments of the present invention provide techniques for device failure prediction using filter-based feature selection and a conformal prediction framework.

In one embodiment, an apparatus comprises at least one processing device comprising a processor coupled to a memory. The at least one processing device is configured to perform the steps of obtaining monitoring data for a plurality of devices in an information technology infrastructure, the monitoring data comprising a plurality of features, determining two or more rankings of the plurality of features using two or more filter-based feature selection algorithms, and selecting a subset of the plurality of features based at least in part on the two or more rankings of the plurality of features. The at least one processing device is also configured to perform the steps of generating a failure prediction for at least a given one of the plurality of devices, wherein the failure prediction for the given device is generated using at least one classifier that takes as input the selected subset of the plurality of features, and applying a conformal prediction framework to the generated failure prediction to obtain a confidence measure indicating a quality of the generated failure prediction and a credibility measure indicating a quality of the monitoring data. The at least one processing device is further configured to perform the step of initiating one or more remedial actions in the information technology infrastructure based at least in part on the generated failure prediction, the confidence measure indicating the quality of the generated failure prediction, and the credibility measure indicating the quality of the monitoring data.

These and other illustrative embodiments include, without limitation, methods, apparatus, networks, systems and processor-readable storage media.

BRIEF DESCRIPTION OF THE DRAWINGS

FIG. 5 shows an example command for retrieving disk drive model data in an illustrative embodiment.

FIGS. 11A and 11B show a table of performance data for different filter-based feature selection methods in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
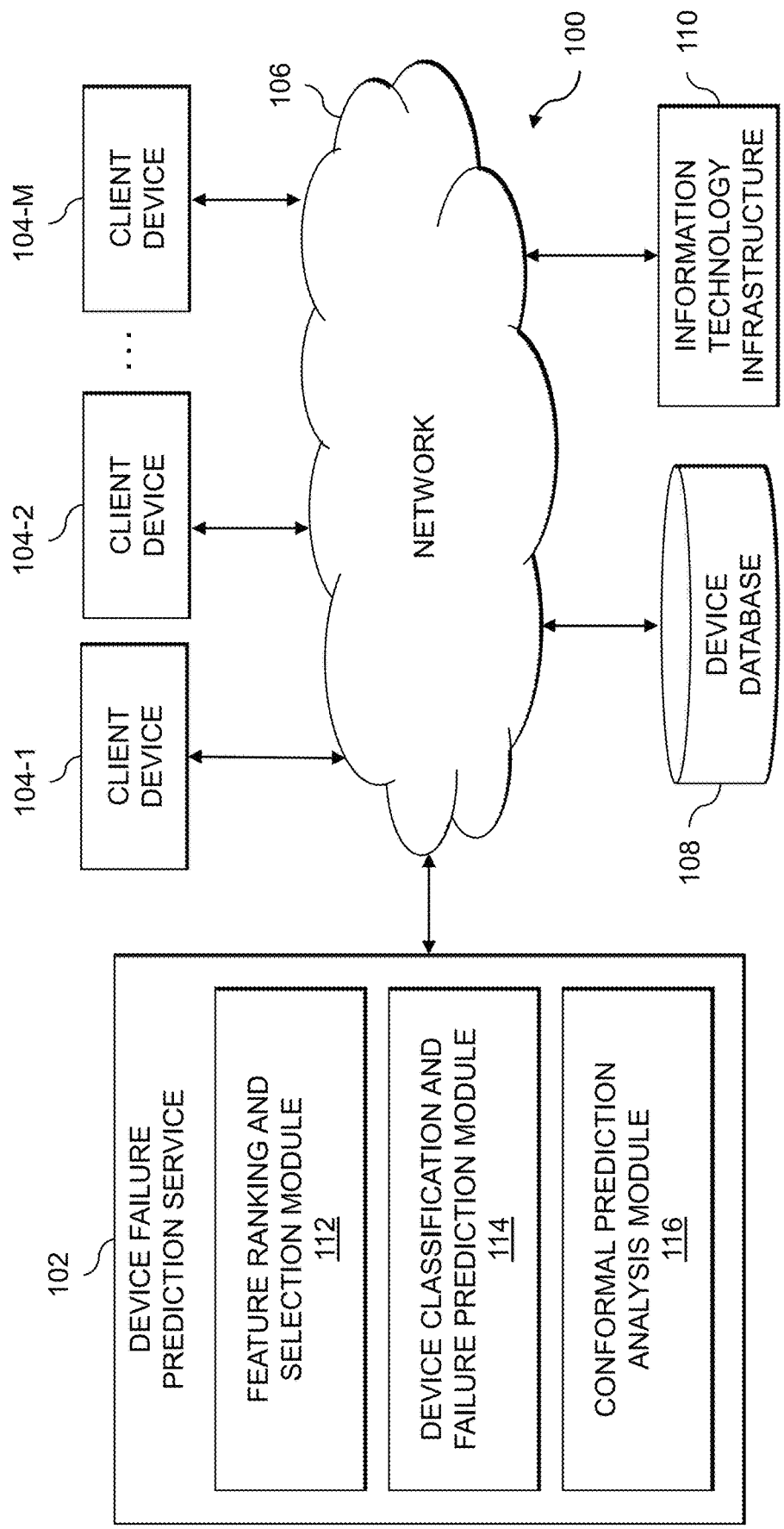
FIG. 1 is a block diagram of an information processing system for device failure prediction using filter-based feature selection and a conformal prediction framework in an illustrative embodiment of the invention.

FIG. 1 shows an information processing system 100 configured in accordance with an illustrative embodiment. The information processing system 100 is assumed to be built on at least one processing platform and provides functionality for device failure prediction using filter-based feature selection and a conformal prediction framework. The information processing system 100 includes a device failure prediction service 102 and a plurality of client devices 104-1, 104-2, ... 104-M (collectively client devices 104). The device failure prediction service 102 and client devices 104 are coupled to a network 106. Also coupled to the network 106 is a device database 108, which may store various information relating to a plurality of assets of information technology (IT) infrastructure 110 also coupled to the network 106. The assets may include, by way of example, physical and virtual computing resources in the IT infrastructure 110. Physical computing resources may include physical hardware such as servers, storage systems, networking equipment, Internet of Things (IoT) devices, other types of processing and computing devices, etc. Virtual computing resources may include virtual machines (VMs), software containers, etc.

In the system 100, the client devices 104 are assumed to be operated by users of the resources or assets of the IT infrastructure 110. For example, the client devices 104 may utilize storage devices in the IT infrastructure 110, and are configured to receive notification from the device failure prediction service 102 when particular ones of such storage devices are predicted to fail. While various embodiments are described below with respect to predicting failure of storage devices, it should be appreciated that the device failure prediction service 102 is not limited solely to prediction failure of storage devices. The IT infrastructure 110, for example, may comprise various types of assets (e.g., physical and virtual computing resources) including various other types of devices. The device failure prediction service 102 may be used to provide failure predictions for such other types of devices in addition to or in place of providing failure predictions for storage devices.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, software containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The device database 108, as discussed above, is configured to store and record information relating to various assets of the IT infrastructure 110 that is used by the device failure prediction service 102 to generate failure predictions. For example, the device database 108 may store various support data including information related to device models and associated historical failure rates, features or parameters obtained from monitoring devices, etc. Various other information may be stored in the device database 108 in other embodiments as discussed in further detail below.

The device database 108 in some embodiments is implemented using one or more storage systems or devices associated with the device failure prediction service 102. In some embodiments, one or more of the storage systems utilized to implement the device database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the device failure prediction service 102, as well as to support communication between the device failure prediction service 102 and other related systems and devices not explicitly shown.

The client devices 104 are configured to access or otherwise utilize assets of the IT infrastructure 110 (e.g., hardware assets, applications or other software running on or hosted by such hardware assets, etc.). In some embodiments, the assets (e.g., physical and virtual computing resources) of the IT infrastructure 110 are operated by or otherwise associated with one or more companies, businesses, organizations, enterprises, or other entities. For example, in some embodiments the assets of the IT infrastructure 110 may be operated by a single entity, such as in the case of a private data center of a particular company. In other embodiments, the assets of the IT infrastructure 110 may be associated with multiple different entities, such as in the case where the assets of the IT infrastructure 110 provide a cloud computing platform or other data center where resources are shared amongst multiple different entities.

The term "user" herein is intended to be broadly construed so as to encompass numerous arrangements of human, hardware, software or firmware entities, as well as combinations of such entities.

In the present embodiment, alerts or notifications generated by the device failure prediction service 102 are provided over network 106 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the device failure prediction service 102. For example, a given host agent may comprise a mobile telephone equipped with a mobile application configured to receive alerts from the device failure prediction service 102 and to provide an interface for the host agent to select particular remedial measures for responding to the alert or notification. Examples of such remedial measures may include, for a storage device that is predicted to fail, backing up data from that storage device to another prior to failure, applying file system check or other utilities to mitigate the risk of failure, replacing the storage device, etc. Similar remedial measures may be used for other types of device. For example, for a server that is predicted to fail, remedial measures may include migrating workloads or applications hosted on that server to another, running utilities to mitigate the risk of failure, replacing components of the server that are likely to cause the predicted failure, etc.

It should be noted that a "host agent" as this term is generally used herein may comprise an automated entity, such as a software entity running on a processing device. Accordingly, a host agent need not be a human entity.

The device failure prediction service 102 in the FIG. 1 embodiment is assumed to be implemented using at least one processing device. Each such processing device generally comprises at least one processor and an associated memory, and implements one or more functional modules for controlling certain features of the device failure prediction service 102. In the FIG. 1 embodiment, the device failure prediction service 102 comprises a feature ranking and selection module 112, a device classification and failure prediction module 114, and a conformal prediction analysis module 116.

The feature ranking and selection module 112 is configured to integrate various filter-based feature selection (FFS) methods using a statistical approach such as the Technique for Order of Preference by Similarity to Ideal Solution (TOPSIS) multi-criteria decision analysis method, to generate overall feature rankings for a device dataset obtained from the device database 108. A subset of such features (e.g., the top X features in the overall feature ranking) are then selected for use by the device classification and failure prediction module 114. The device classification and failure prediction module 114 is configured to utilize the selected features as input to a set of classification models that generate predictions regarding whether particular devices have failed or are likely to fail within some designated threshold period of time. The conformal prediction analysis module 116 is configured to implement a conformal prediction framework that generates measures of the confidence and credibility of the classifications. Such information is utilized to generate alerts or notifications sent to the client devices 104, and/or to initiate remedial action to address the failure or predicted failure of devices. Such remedial action may include, for a storage device that is predicted to fail, backing up data from that storage device prior to failure, applying file system check or other utilities to mitigate the risk of failure, replacing the storage device, etc.

It is to be appreciated that the particular arrangement of the device failure prediction service 102, client devices 104, device database 108 and IT infrastructure 110 illustrated in the FIG. 1 embodiment is presented by way of example only, and alternative arrangements can be used in other embodiments. For example, the device failure prediction service 102, or one or more portions thereof such as the feature ranking and selection module 112, the device classification and failure prediction module 114, and the conformal prediction analysis module 116, may in some embodiments be implemented internal to one or more of the client devices 104 or the IT infrastructure 110. As another example, the functionality associated with the feature ranking and selection module 112, the device classification and failure prediction module 114, and the conformal prediction analysis module 116 may be combined into one module, or separated across more than three modules with the multiple modules possibly being implemented with multiple distinct processors or processing devices.

At least portions of the feature ranking and selection module 112, the device classification and failure prediction module 114, and the conformal prediction analysis module 116 may be implemented at least in part in the form of software that is stored in memory and executed by a processor.

It is to be understood that the particular set of elements shown in FIG. 1 for device failure prediction using filter-based feature selection and a conformal prediction framework is presented by way of illustrative example only, and in other embodiments additional or alternative elements may be used. Thus, another embodiment may include additional or alternative systems, devices and other network entities, as well as different arrangements of modules and other components.

The device failure prediction service 102 may be part of or otherwise associated with another system, such as a governance, risk and compliance (GRC) system, a distributed notification platform, IT infrastructure monitoring tools, etc.

The device failure prediction service 102, and other portions of the system 100, in some embodiments, may be part of cloud infrastructure as will be described in further detail below. The cloud infrastructure hosting the device failure prediction service 102 may also host any combination of the device failure prediction service 102, one or more of the client devices 104, the device database 108 and the IT infrastructure 110.

The device failure prediction service 102 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 104 and the device failure prediction service 102 or components thereof (e.g., the feature ranking and selection module 112, the device classification and failure prediction module 114, and the conformal prediction analysis module 116) may be implemented on respective distinct processing platforms, although numerous other arrangements are possible. For example, in some embodiments at least portions of the device failure prediction service 102 and one or more of the client devices 104 are implemented on the same processing platform. A given client device (e.g., 104-1) can therefore be implemented at least in part within at least one processing platform that implements at least a portion of the device failure prediction service 102. Similarly, at least a portion of the device failure prediction service 102 may be implemented at least in part within at least one processing platform that implements at least a portion of the IT infrastructure 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the device failure prediction service 102, the client devices 104, the device database 108 and the IT infrastructure 110, or portions or components thereof, to reside in different data centers. Numerous other distributed implementations are possible. The device failure prediction service 102 can also be implemented in a distributed manner across multiple data centers.

Additional examples of processing platforms utilized to implement the device failure prediction service 102 in illustrative embodiments will be described in more detail below in conjunction with FIGS. 14 and 15.

It is to be appreciated that these and other features of illustrative embodiments are presented by way of example only, and should not be construed as limiting in any way.

An exemplary process for device failure prediction using filter-based feature selection and a conformal prediction framework will now be described in more detail with reference to the flow diagram of FIG. 2. It is to be understood that this particular process is only an example, and that additional or alternative processes for device failure prediction using filter-based feature selection and a conformal prediction framework can be carried out in other embodiments.

In this embodiment, the process includes steps 200 through 210. These steps are assumed to be performed by the device failure prediction service 102 utilizing the feature ranking and selection module 112, the device classification and failure prediction module 114, and the conformal prediction analysis module 116. The process begins with step 200, obtaining monitoring data for a plurality of devices in an information technology infrastructure, the monitoring data comprising a plurality of features.

In step 202, two or more rankings of the plurality of features are determined using two or more FFS algorithms. The two or more FFS algorithms may include two or more of: a two sample t-test (T-TEST) algorithm; a Wilcoxon rank-sum (WRS) algorithm; a max-relevance min-redundancy (MRMR) algorithm; a mutual information maximization (MIM) algorithm; a mutual information feature selection (MIFS) algorithm; a joint mutual information (JMI) algorithm; a double input symmetrical relevance (DISR) algorithm; a conditional mutual information maximization (CMIM) algorithm; an interaction capping (ICAP) algorithm; and a conditional infomax feature extraction (CIFE) algorithm.

A subset of the plurality of features are selected in step 204 based at least in part on the two or more rankings of the plurality of features. Step 204 may include integrating the two or more rankings of the plurality of features utilizing a multi-criteria decision analysis algorithm, such as a TOPSIS multi-criteria decision analysis algorithm. Integrating the two or more rankings of the plurality of features utilizing the multi-criteria decision analysis algorithm may comprise performing vector normalization for each of the two or more rankings of the plurality of features, calculating, for each of the plurality of features across the two or more rankings of the plurality of features, distances from an ideal best ranking value and an ideal worst ranking value, and calculating, for each of the plurality of features across the two or more rankings of the plurality of features, a performance score based at least in part on the distances from the ideal best ranking value and the ideal worst ranking value. Step 204 may include calculating the performance scores for each of the plurality of features across the two or more ranking of the plurality of features, and selecting a designated number of the plurality of features having the highest calculated performance scores.

Figure 2:
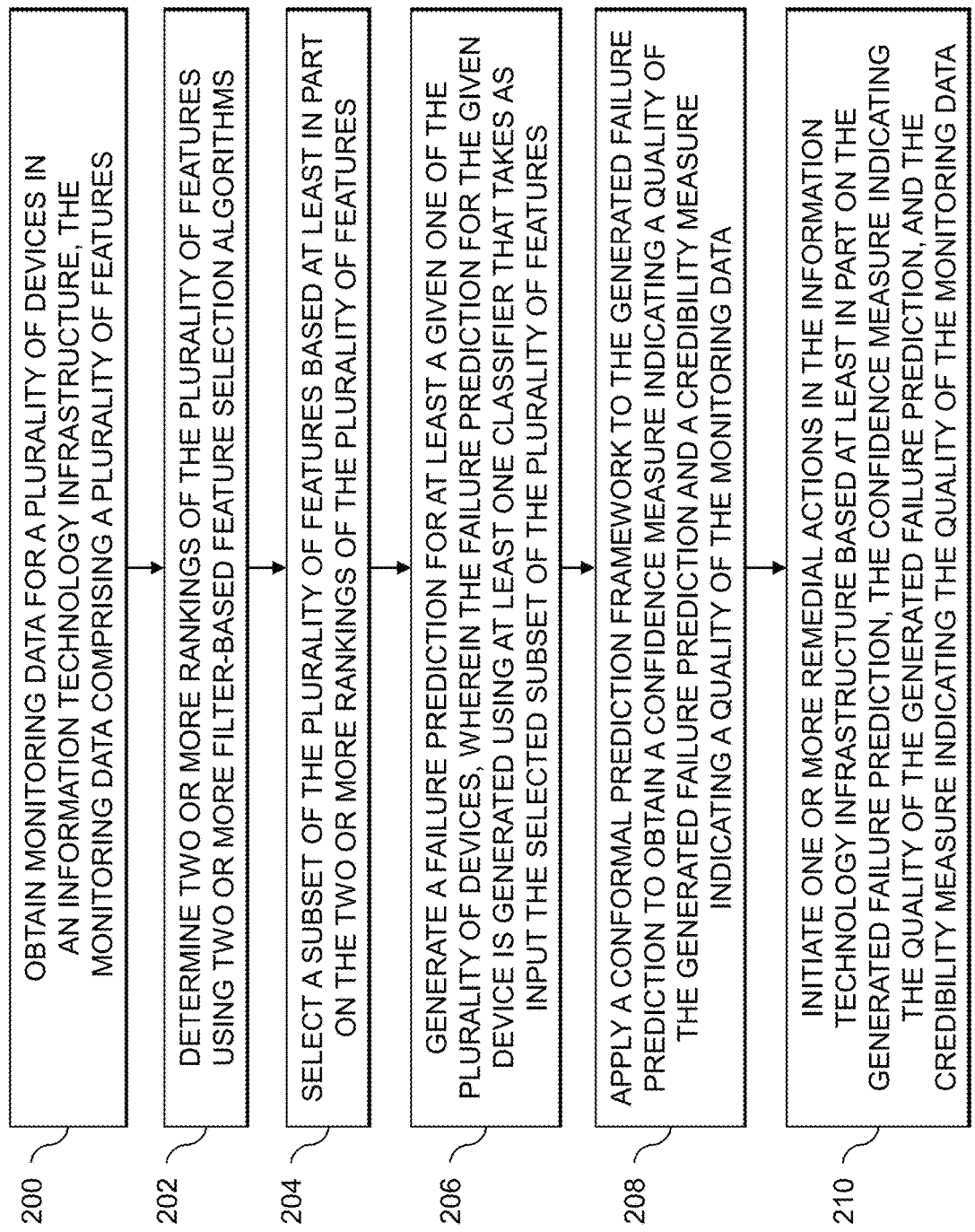
FIG. 2 is a flow diagram of an exemplary process for device failure prediction using filter-based feature selection and a conformal prediction framework in an illustrative embodiment.

The FIG. 2 process continues with step 206, generating a failure prediction for at least a given one of the plurality of devices, wherein the failure prediction for the given device is generated using at least one classifier that takes as input the selected subset of the plurality of features. The at least one classifier may comprise at least one of: a support vector machine (SVM) classifier; a random forest (RF) classifier; a decision tree (DT) classifier; a linear discriminant analysis (LDA) classifier; a Naïve Bayes (NB) classifier; a fuzzy logic (FL) classifier; and a k nearest neighbor (KNN) classifier. In step 208, a conformal prediction framework is applied to the generated failure prediction to obtain a confidence measure indicating a quality of the generated failure prediction and a credibility measure indicating a quality of the monitoring data. Step 208 may include utilizing inductive conformal prediction (ICP) with an incremental stochastic gradient descent (SGD) machine learning algorithm.

One or more remedial actions are initiated in the information technology infrastructure in step 210 based at least in part on the generated failure prediction, the confidence measure indicating the quality of the generated failure prediction, and the credibility measure indicating the quality of the monitoring data. In some embodiments, step 206 includes generating an indication of a likelihood of failure of the given device in a designated time frame and step 210 includes providing a list (e.g., as output via a graphical user interface (GUI), an alert or notification, etc.) of at least a subset of the plurality of devices in a descending order of their associated likelihood of failure in the designated time frame. Where the given device comprises a storage device, the one or more remedial actions may comprise at least one of: backing up data from the storage device to another storage device in the information technology infrastructure; applying a file system check to the storage device; and replacing the storage device with another storage device. Where the given device comprises a server, the one or more remedial actions may comprise at least one of: migrating at least one of one or more workloads and one or more application hosts on the server to another server in the information technology infrastructure; and replacing at least one of one or more hardware components and one or more software components of the server.

Storage device failure detection is a problem across the storage industry. Failure of storage devices such as disk drives can not only cause data unavailability, but can also lead to permanent data loss with resulting impacts on a business or other enterprise or entity utilizing the storage devices. Further, as the size of storage systems across large-scale installations continues to grow to unprecedented scale, failure of storage devices becomes the norm rather than the exception. Despite significant effort, both in industry and academia, high reliability of storage devices remains a major challenge including for storage devices running or operating in large-scale enterprise storage systems.

In a Dell EMC Data Domain or Dell EMC PowerProtect DD environment, for example, numerous bugs may be reported from customers or other users, such as where a deteriorating drive or other storage device isn't identified as failed fast enough leading to large input-output (TO) latencies and eventually IO timeout and Data Domain File System (DDFS) panics. Current storage device failure prediction models may rely on an inefficient method of handling important features of various storage devices (e.g., hard drives) and thus may fail to detect device health proactively. There is thus a need for the stack to be resilient enough to handle early-failure detection of a single storage device or drive, or multiple storage devices or drives.

In some cases, storage systems are risk-sensitive systems where the cost of a bad decision can be very high. Therefore, there is a need for an efficient multi-criteria decision analysis method for forecasting models. Illustrative embodiments provide reliable and more accurate techniques for forecasting disk, drive or other storage device health. To do so, some embodiments utilize a feature ranking approach to improve the stability of results obtained by integrating FFS methods and utilizing a statistical approach for evaluation such as the TOPSIS multi-criteria decision analysis method. Advantageously, the proposed solution is model independent such that the output can be fed to any of a variety of forecasting algorithms to obtain more reliable and accurate forecasting results. The model with the best accuracy is selected, and then a conformal prediction framework may be applied for producing reliable predictions. The output has a confidence (e.g., for each of its predictions) and credibility (e.g., the quality of the data on which a decision is based) associated with each forecast. In some embodiments, advantages of increased stability and improved classification performance relative to conventional techniques are provided. Further, such increased stability and improved classification performance is obtained at significantly lower computational cost than conventional techniques. Confidence and credibility scores are also advantageously provided for each of the forecasts.

Various embodiments will now be described with respect to an example implementation of the device failure prediction service utilizing an Auto Support (ASUP) dataset, referred to below as the sample dataset, from a Data Domain environment. Specifically, the sample dataset includes disk drive health data collected from year 2014 to 2019. Missing values in the sample dataset were handled by substituting median values. A multi-criteria decision analysis method is used for feature selection, and thus out of 61 parameters the top 15 most contributing features were used. The selected features are fed to seven different classification algorithms to perform a comparative study of the results with conventional techniques.

Figure 3:
FIG. 3 shows a table of summary information associated with device failure for a sample dataset in an illustrative embodiment.
Figure 4:
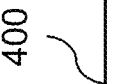
FIG. 4 shows a table of device failure information for different device models in a sample dataset in an illustrative embodiment.

The sample dataset includes a total of over two million disk drives from ten different disk vendors. The overall disk failure rate was 0.135%, as summarized in the table 300 of FIG. 3. FIG. 4 shows a table 400 illustrative failure information for different disk drive models in the sample dataset. For analysis, a particular disk drive model, denoted as Disk Drive Model A in the table 400, is selected for model evaluation as it has a larger number of disk drive failures (e.g., 0.2%) than other disk drive models (e.g., denoted as Disk Drive Model B, C, . . . H) in the sample dataset, as illustrated in the table 400. To obtain data for Disk Drive Model A from ASUP, the command shown in the pseudo-code 500 of FIG. 5 may be utilized.

Feature selection is an important step in predictive modeling processes, as feature selection is one of the best weapons against the "Curse of Dimensionality" (e.g., phenomena that arise when analyzing data in a high-dimensional space that does not occur in a low-dimensional setting). Feature selection can also reduce overall training times, provide a powerful defense against overfitting, and increase model generalizability and accuracy. Picking a correct feature selection technique enables development of simpler and faster machine learning models. In some embodiments, FFS methods are used over wrapper feature selection methods as FFS methods provide various advantages relative to wrapper feature selection methods. For example, FFS methods are much faster as compared to wrapper feature selection methods, as FFS methods do not involve model training while wrapper feature selection methods are computationally very expensive. As another example, FFS methods use statistical methods for evaluation of a subset of features, while wrapper feature selection methods use cross validation. As a further example, using the subset of features from wrapper feature selection methods makes the model more prone to overfitting as compared to using a subset of features selected utilizing FFS methods.

Although FFS methods are robust against overfitting, FFS methods do not take into account feature-feature interactions. Thus, some embodiments utilize a novel ensemble method that improves the stability of results obtained by integrating several FFS methods. The TOPSIS method is used in some embodiments to score the features and choose the most informative ones for the classification task. By finding the important features via a multi-criteria decision analysis method, the solutions described herein demonstrate a proficient way for ranking features without concern about the selection of a suitable FFS method for a specific problem. For the sample dataset, a hybrid selection process is utilized. Both Self-Monitoring, Analysis and Reporting Technology (SMART) and Small Computer System Interface (SCSI) tools may be used to return various values for selecting parameters from the sample dataset (which, as noted above, includes 61 parameters).

Figure 6:
FIG. 6 shows a table of filter-based features selection methods used for evaluation in an illustrative embodiment.

FIG. 6 shows a table 600 of various filter-based feature selection methods that may be utilized for evaluation, including T-TEST, WRS, MRMR, MIM, MIFS, JMI, DISR, CMIM, ICAP and CIFE algorithms. It should be appreciated that the FFS methods shown in table 600 of FIG. 6 are presented by way of example only, and that embodiments are not limited solely to use with these FFS methods. Various other FFS methods may be used in addition to or in place of one or more of the FFS methods shown in table 600 of FIG. 6.

Figure 7:
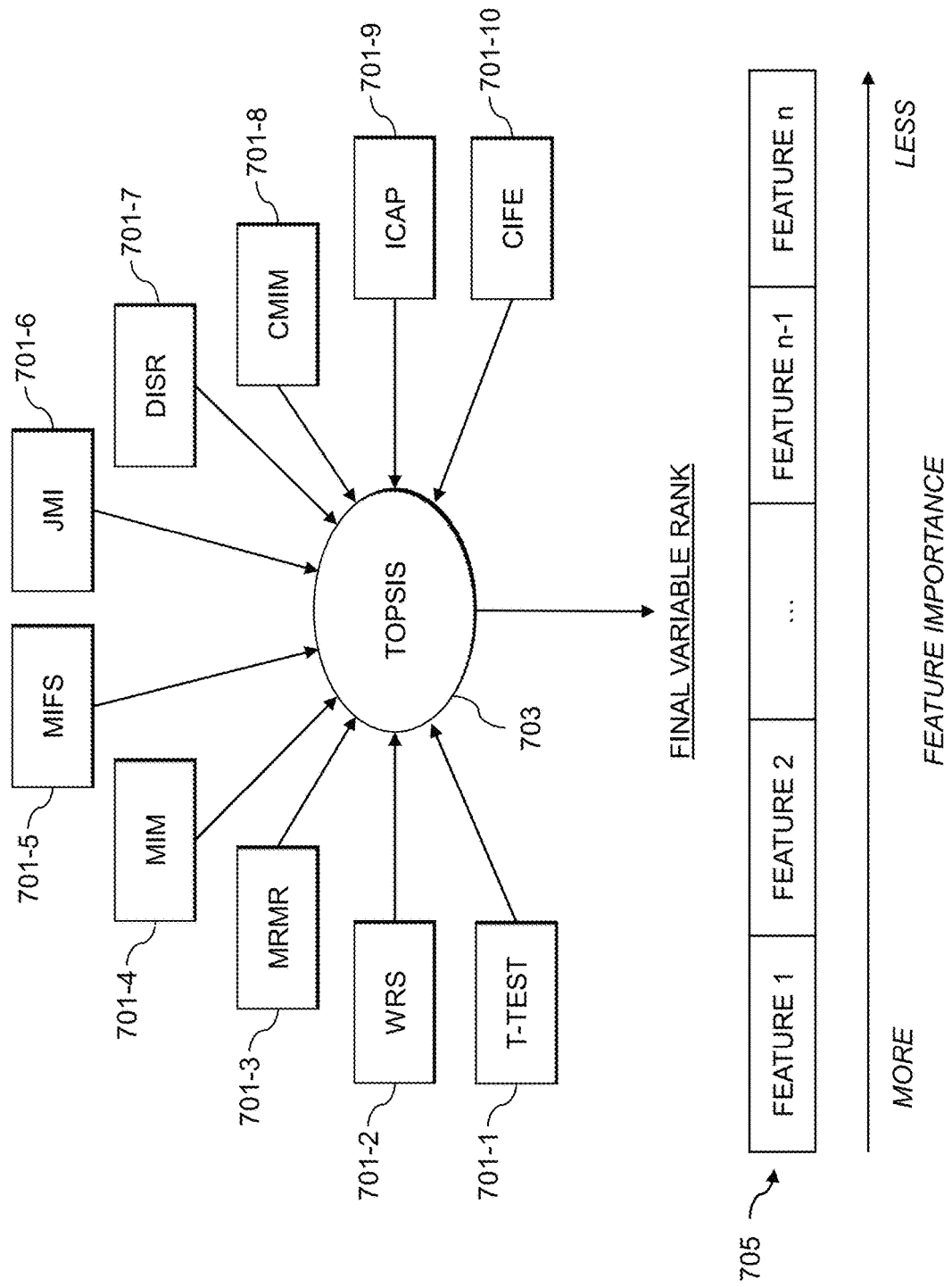
FIG. 7 shows a process flow for a feature ranking procedure in an illustrative embodiment.

FIG. 7 illustrates a feature ranking procedure. As illustrated in FIG. 7, a number of different FFS methods 701-1 through 701-10 (e.g., the FFS methods shown in table 600 of FIG. 6, T-TEST 701-1, WRS 701-2, MRMR 701-3, MIM 701-4, MIFS 701-5, JMI 701-6, DISR 701-7, CMIM 701-8, ICAP 701-9 and CIFE 701-10) are integrated using a TOPSIS method 703 for feature ranking. The output of the TOPSIS method 703 is a final variable or feature ranking 705, in which features 1, 2, . . . n−1, n are ranked (e.g., in order of most to least important). The workflow of the TOPSIS method 703 includes the following steps:

1. Formula for Vector Normalization:

$$\bar{x}_{ij} = \frac{x_{ij}}{\sqrt{\sum_{j=1}^{n} x_{ij}^2}}$$

2. Calculate Euclidean Distance from Ideal Best:

$S_i^+ = [\sum_{j=1}^{m}(v_{ij}-v_j^+)^2]^{0.5}$, where $v_j^+$ denotes the Ideal (best) value 3. Calculate Euclidean Distance from Ideal Worst:

$S_i^- = [\sum_{j=1}^{m}(v_{ij}-v_j^-)^2]^{0.5}$, where $v_j^-$ denotes the Ideal (worst) value 4. Calculate Performance Scores $$P_i = \frac{S_i^-}{S_i^+ + S_i^-}$$

Figure 8:
FIG. 8 shows a table of feature ranking scores for a sample dataset in an illustrative embodiment.

In the equations above, $x_{ij}$ represents the element value of each criteria or feature, and $v_{ij}$ represent the normalized value of each criteria or feature. For example, values of $x_{11}$, $x_{12}$, $x_{13}$, $x_{14}$ may represent features 1, 2, 3 and 4. Normalization is then performed to obtain a normalized decision matrix $\tilde{x}_{ij}$. The normalized value is multiplied with weights w and the result is the normalized decision matrix. Here, $v_{ij}$ is the value of the weighted normalized result for each element. It should be noted that weights can be taken or computed using various approaches. In some embodiments, an entropy method is used for assigning weights, such that $v_{ij}=x_{ij}*w$. For the sample dataset, the feature ranking shown in the table 800 of FIG. 8 was obtained using the above steps. The table 800 of FIG. 8 shows the performance scores and ranks for features such as uncorrected read error, corrected verify error, disk temperature, disk read, disk reallocated, start/stop count, and log count that are obtained using SMART or SCSI commands.

Various classification models are used to compare results against the FFS methods, including SVM, RF, DT, LDA, NB, FL and KNN classifiers.

Figure 9:
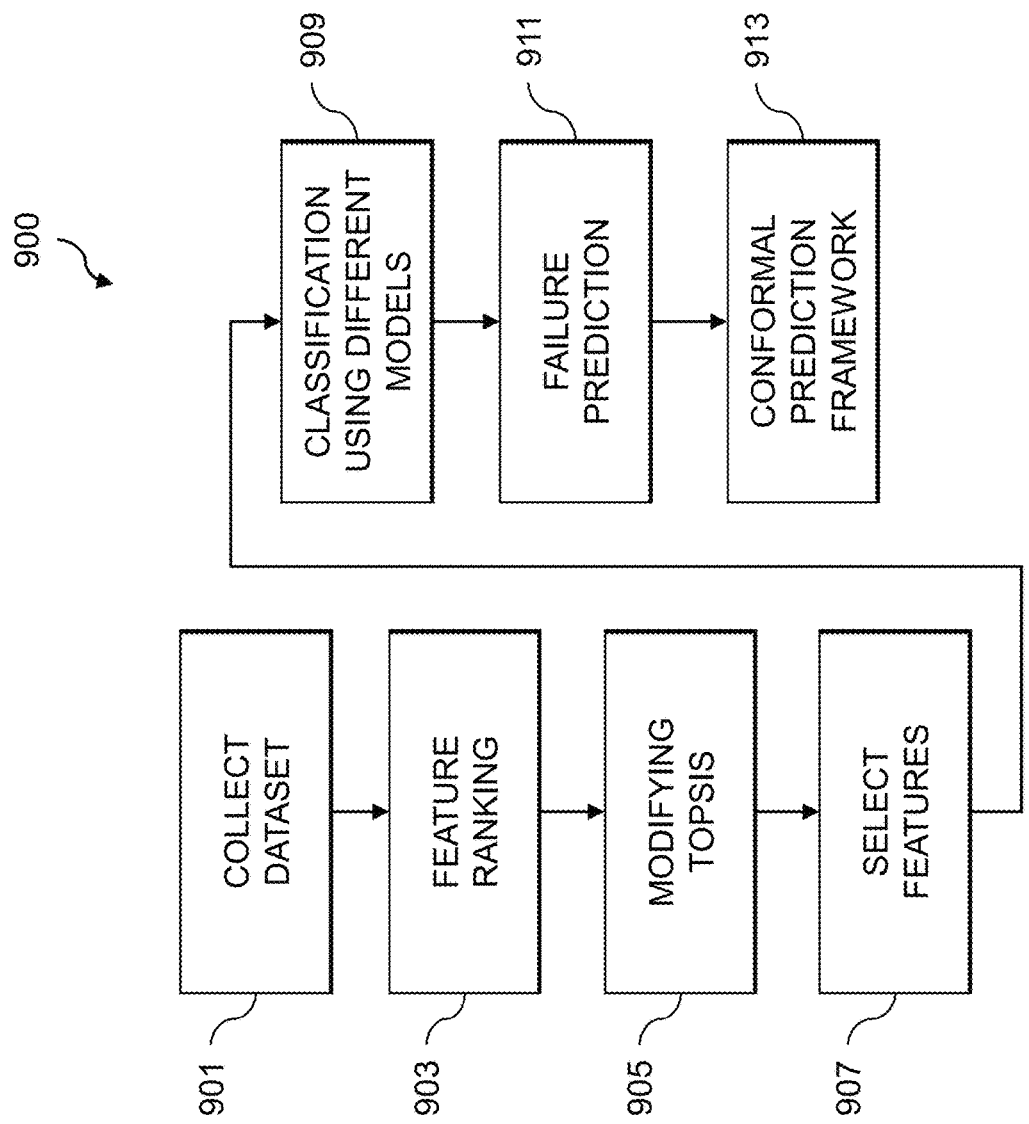
FIG. 9 shows a process flow for device failure prediction in an illustrative embodiment.

FIG. 9 shows a process flow 900 for performing device failure prediction. The process flow 900 begins in step 901 with collecting the dataset, such as utilizing ASUP as discussed above. Next, in step 903, feature ranking is performed using filter-based methods (e.g., using different FFS methods such as T-TEST, WRS, MRMR, MIM, MIFS, JMI, DISR, CMIM, ICAP, CIFE, etc.). Modifying TOPSIS is performed in step 905 to integrate the feature ranking results from the different filter-based methods. Feature selection is then performed in step 907, such as selecting a top X (e.g., a top 15) features. Classification is performed in step 909 using different models with the selected features. The different models may include, for example, SVM, RF, DT, LDA, NB, FL and KNN. Failure prediction (e.g., for a storage device such as a hard drive) is performed in step 911, and the results are provided to a conformal prediction framework in step 913.

To save computational time, k-fold cross-validation testing is used to investigate performance of the failure prediction model. In k-fold cross-validation, data is divided into k-subsets. Each time, one of the k-subsets is used for testing, while the remaining k−1 subsets are used as training data. The mean error across all k iterations is then calculated. Various evaluation measures may be used, including Area Under Curve (AUC) and Matthews Correlation Coefficient (MCC).

Cross validation results using the sample dataset will now be described. The cross-validation results are obtained from 30 repetitions of a 10-fold cross-validation procedure. For a fair performance evaluation, different constraints that affect classification performance are considered, including the training dataset, classifier model, and number of selected features. In this regard, different possible combinations are evaluated which contain seven states due to the seven classifiers (e.g., SVM, RF, DT, LDA, NB, FL and KNN) applied to the sample dataset. Different-sized subsets of features are selected (e.g., 5, 10, 15 and 20) for each feature selection method, considering which method reaches the highest accuracy in each of the seven states.

Figure 10:
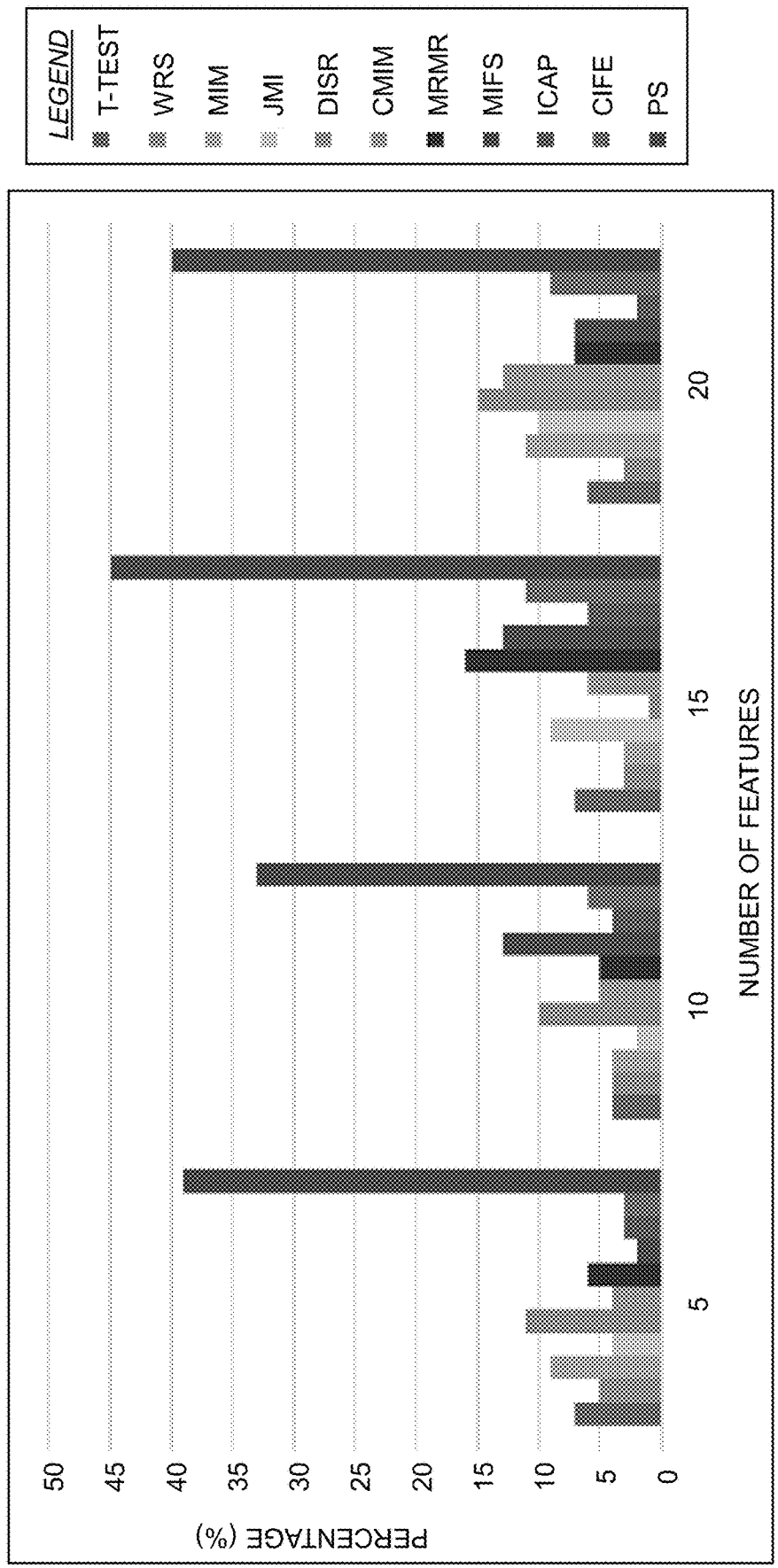
FIG. 10 shows a chart of performance of different filter-based feature selection methods in an illustrative embodiment.

FIG. 10 shows a chart 1000 illustrating performance of a different FFS methods. More particularly, the chart 1000 illustrates the percentage of states that each FFS method reached the best performance (e.g., winning frequency) for the different-sized subsets of features. The chart 1000 shows the winning frequencies for different-sized subsets of features, including 5, 10, 15 and 20 selected features. For each, the bars (from left to right) illustrating the winning frequency for T-TEST, WRS, MIM, JMI, DISR, CMIM, MRMR, MIFS, ICAP, CIFE, and the Proposed Solution (PS) that integrates such different FFS methods utilizing TOPSIS. As illustrated, the PS performs best for all sizes of feature subsets in comparison with the different FFS methods, with the peak result being obtained using 15 features. It should be appreciated, however, that the particular number of selected features is a design choice that may be varied depending on the implementation and is not limited to 15, or an increment of 5 (e.g., it is possible to select 11 features, 12 features, 13 features, etc.).

The same number of features (e.g., 15 features) is passed as input to the different classifiers (e.g., SVM, RF, DT, LDA, NB, FL and KNN). FIGS. 11A and 11B show portions of a table 1100-1 and 1100-2 (collectively, 1100) of the results using such different classifiers. The table 1100 of FIGS. 11A and 11B shows the performance of seven classifiers using 15 top ranked features selected by the PS and other FFS approaches. As shown in the table 1100 of FIGS. 11A and 11B, the PS outperforms the other FFS methods in terms of robustness in classification performance. By measuring the number of times that a method obtains the best results, it is observed that the best frequency is achieved using the PS (e.g., 7 out of 7 times). Illustrative embodiments have the advantage of stability and classification performance as compared with other approaches. Further, illustrative embodiments have much lower computational complexity and can produce more general results without overfitting.

A conformal prediction framework utilized in some embodiments will now be described. In classical machine learning, it is expected that past performance indicates future performance. For instance, if a model is 89% accurate on test data, it may be assumed that the model is 89% accurate for production data. If a model has an AUC of 0.76 on test data, it may be assumed that the model has an AUC of 0.76 on production data. Apart from the observation above, it is important to consider how good estimates are, if there are any guarantees, and to consider new labels. Conformal prediction frameworks answer these and other questions. For example, conformal prediction provides error bounds on a per-instance basis (unlike Probably Approximately Correct (PAC) theory) and probabilities are well-calibrated. Conformal prediction does not need to know prior probabilities (unlike Bayesian learning). Conformal prediction can also be used with any machine learning algorithm, and can be applied online, offline or semi-offline.

Conformal prediction is a framework that complements the predictions of machine learning algorithms with reliable measures of confidence. Transductive Conformal Prediction (TCP) gives results with higher validity than Inductive Conformal Prediction (ICP). ICP, however, is computationally faster than TCP. This is one reason that ICP may be used with incremental SGD as the underlying machine learning algorithm. Conformal prediction outputs multi-value prediction regions. Given a test pattern $X_i$ and significance level $\in$, a conformal predictor outputs a prediction region $\Gamma_i^{\in}$ that contains $y_j$ with probability $1-\in$.

Figure 12:
FIG. 12 shows a table of labels and associated confidence and credibility measures produced using a conformal prediction framework in an illustrative embodiment.

The conformal prediction framework provides two measures—confidence and credibility. The confidence measures indicate the quality of predictions, while the credibility measures indicate the quality of the data on which decisions (e.g., predictions) are based. The credibility measures provide a filter mechanism with which certain predictions may be rejected. FIG. 12 shows a table 1200 of sample labels along with their respective confidence and credibility measures produced using a conformal prediction framework. Each row of the table 1200 of FIG. 12 may correspond to a prediction of failure for a particular hard drive or other storage device (e.g., 0 for working, 1 for failure).

Figure 13:
FIG. 13 shows a table of confidence and credibility measure for different storage drives in an illustrative embodiment.

From the previous step, the classifier which gives better results than the others is selected, and conformal prediction is applied to provide confidence and credibility scores for each forecasted value. The forecasted values may, for example, give a prediction for the next 5 days as to whether particular hard drives or other storage devices are likely to experience failure. FIG. 13 shows a table 1300 of confidence and credibility measures for different disk serial numbers (SNs).

In some embodiments, the device failure prediction service 102 provides a feature ranking approach to improve the stability of results that: integrates FFS methods; utilizes a statistical approach (e.g., TOPSIS) for ranking features from various FFS methods; and finds important features via a multi-criteria decision analysis method. The device failure prediction service 102 demonstrates a proficient way for ranking features without concern about the selection of suitable FFS method(s) for a specific problem. Advantageously, the device failure prediction service 102 is model independent as the output of the TOPSIS (or other statistical approach) layer or step can be fed to any desired binary classification model as per end user choice. The device failure prediction service 102 also advantageously maintains stability of results and solves overfitting issues, is scalable in higher dimension, and is computationally cheap when compared to conventional FFS and wrapper feature selection methods.

A conformal prediction framework may also be used in some embodiments to complement the predictions of machine learning algorithms using the above-described solutions for reliable forecasts. The conformal prediction framework provides confidence measures which can be interpreted as an indication of the quality of prediction, and credibility measures which provide a user with a filter mechanism with which certain predictions can be accepted or rejected. The conformal prediction framework may display disk drives or other storage devices in a descending order of their likelihood of failure in a next N days based on the confidence and credibility measures. Output of the conformal prediction framework may be used to generate and send alerts to users, notifications to sales or support teams in an auto-support field or system, etc.

The device failure prediction service 102 described herein may be applied to a wide variety of use case scenarios. For example, the device failure prediction service 102 may be implemented or embedded in a cloud analytics platform (e.g., Dell EMC CloudIQ). The device failure prediction service 102 is illustratively independent of classification algorithm, and hence can obtain stability and improved classification performance when compared with conventional approaches. The device failure prediction service 102 may also be utilized for predicting failure of storage devices, such as solid state drives (SSDs). As an example, an SSD disk failure model may be used for detecting SSD failures in an all-flash enterprise storage system such as Dell EMC XtremIO. Features may be selected using the methods described herein, and SSD disks which show signs of failure in a next N days can be displayed visually on a dashboard, used to generate alerts or notifications, etc.

The device failure prediction service 102 may also be used with or implemented in a Data Domain System Manager (DDSM) and/or Data Domain Management Center (DDMC) of a Data Domain System. In Data Domain systems, disk health can be tracked from system logs and an internal time-series database may be created. This database can be an input to the model for forecasting disk failure. Reliable and accurate future disk failure predictions on Data Domain system disk group(s) can thus be obtained. The device failure prediction service 102 described herein may be further used for modelling component failure generally, and is not limited solely to use in modeling or predicting failure of storage devices. The illustrative use cases relating to predicting failure of storage devices may utilize binary classification, and can be extended to various other components of computing systems and IT infrastructure 110 such as a central processing unit (CPU) or other processor, a battery, a network interface or network equipment, etc. Datasets for each component can be created, analyzed and fed to the model for forecasting.

Illustrative embodiments provide a number of advantages relative to conventional techniques. Conventional techniques for hard drive or other storage device failure prediction, for example, typically rely on a user manually deciding and selecting an optimum number of features required for prediction. The device failure prediction service 102 described herein, for example, ranks features that are the output of various feature selection methods to give an optimal number of features to be selected for better prediction, and does not require manual selection or finding a suitable feature selection method for a particular problem.

Conventional techniques also suffer from issues related to overfitting and stability of results, while the device failure prediction service 102 solves overfitting issues and maintains stability of results. The device failure prediction service 102 is also scalable in high dimensions, as compared with conventional techniques that are typically not scalable. Further, the device failure prediction service 102 is computationally inexpensive as it utilizes statistical approaches, relative to computationally expensive conventional techniques. Conventional techniques are also sometimes model dependent, whereas the device failure prediction service 102 is model independent. Conventional techniques may also provide binary predictions only, without confidence scores for forecasts, whereas the device failure prediction service 102 provides confidence values for each forecast value (e.g., conformal measures).

Some conventional techniques utilize information gain as a feature selection method. Information gain is biased against variables with a large number of distinct values in favor of variables that have observations with large values. Thus, approaches based on information gain suffer from overfitting issues and do not work well for attributes with a large number of distinct values. Other conventional techniques may utilize stochastic gradient boosting (SGB). SGB is a model with built-in feature selection thought to be more efficient than feature selection in wrapper and filter-based methods. The feature selection of SGB, however, cannot always be trusted because the importance (e.g., relative influence) of the features is still provided by the model even when the model has bad performance (e.g., very poor accuracy in testing). In such cases, the SGB model is wrong and so the selected features may also be wrong.

In some conventional approaches for analysis of disk failure, a reallocated sectors (RAS) count threshold is used for disk failure policy where the RAS count threshold may be specific to a backup workload. The RAS count threshold is hand-picked for building the model to predict disk failure without considering other features, and does not scale. Some conventional techniques may also utilize a back propagation (BP) artificial neural network for feature selection, or a Long Short Term Memory (LSTM) Recurrent Neural Network (RNN), which are highly computationally expensive.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for device failure prediction using filter-based feature selection and a conformal prediction framework will now be described in greater detail with reference to FIGS. 14 and 15. Although described in the context of system 100, these platforms may also be used to implement at least portions of other information processing systems in other embodiments.

Figure 14:
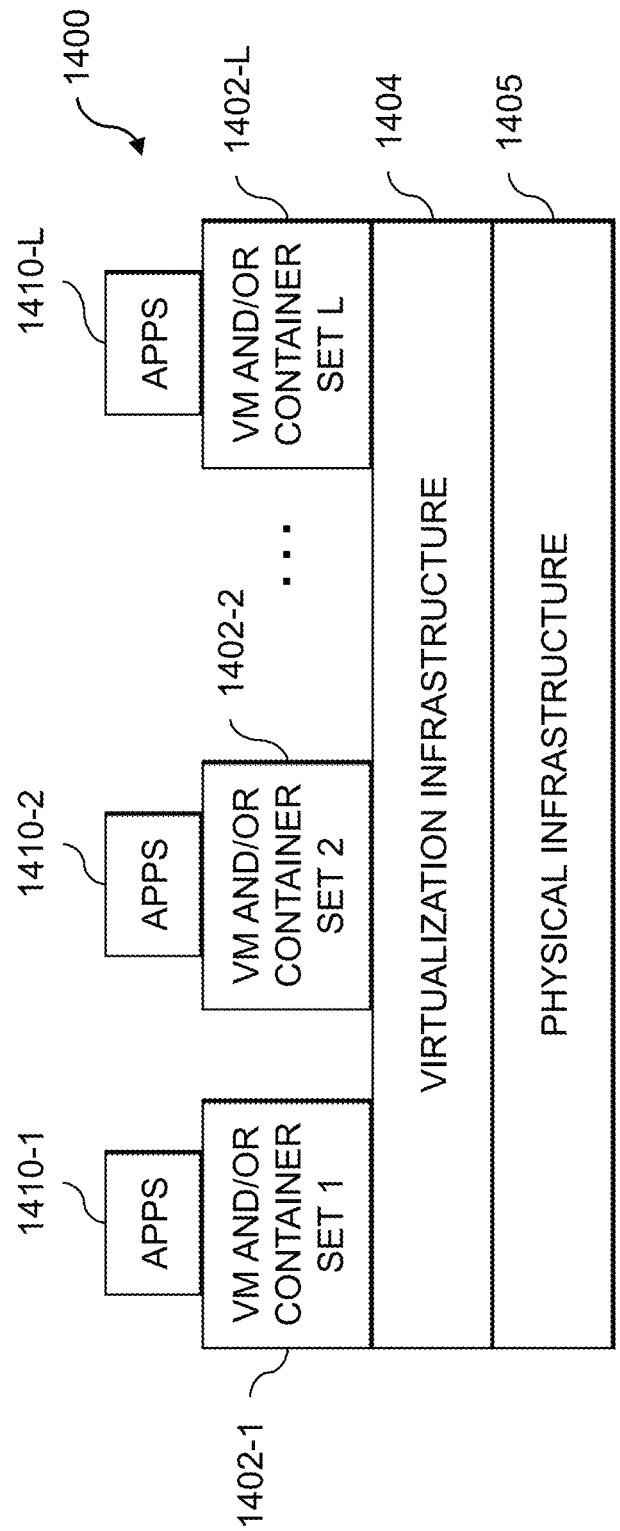
FIGS. 14 and 15 show examples of processing platforms that may be utilized to implement at least a portion of an information processing system in illustrative embodiments.
Figure 15:
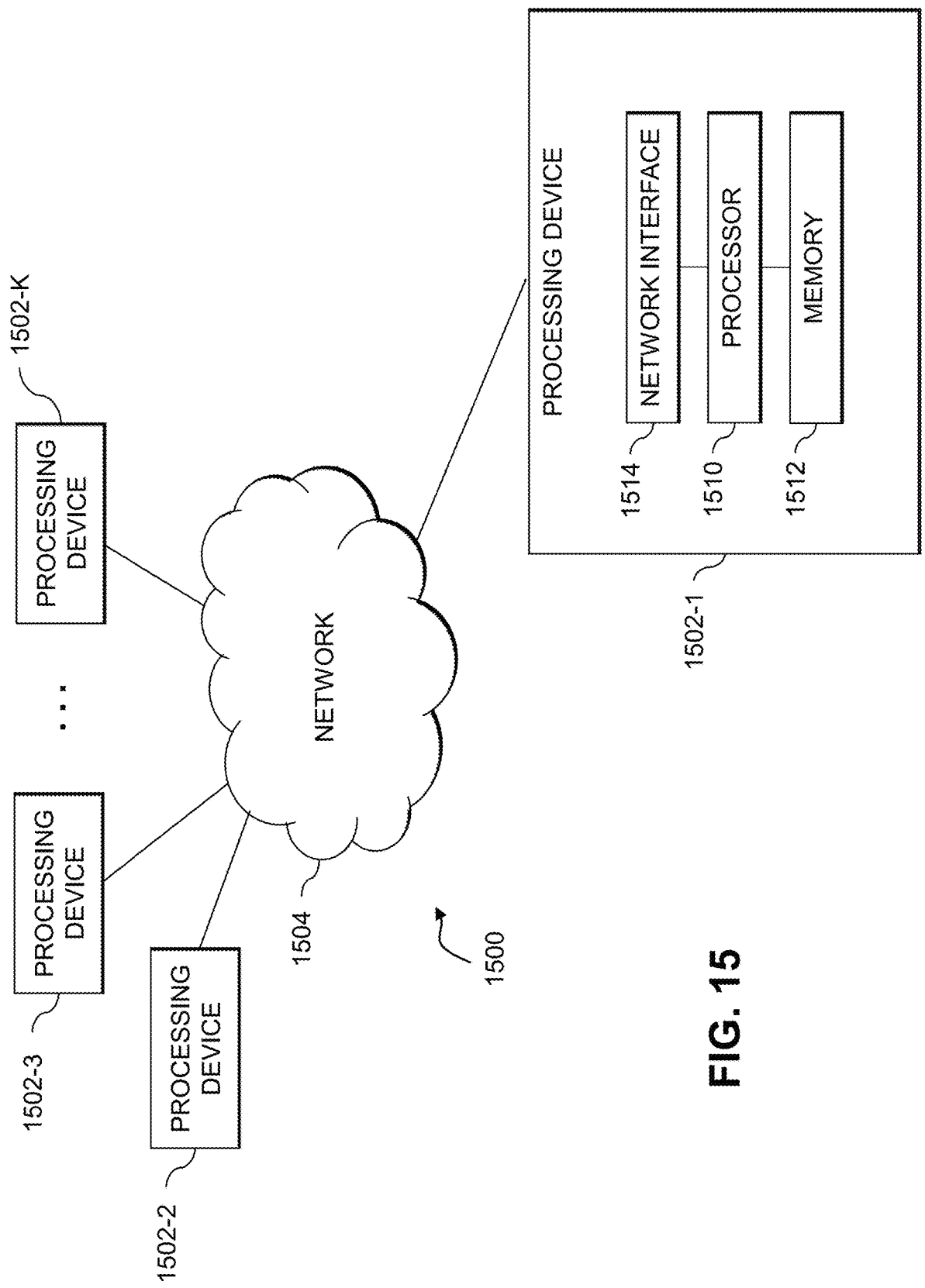

FIG. 14 shows an example processing platform comprising cloud infrastructure 1400. The cloud infrastructure 1400 comprises a combination of physical and virtual processing resources that may be utilized to implement at least a portion of the information processing system 100 in FIG. 1. The cloud infrastructure 1400 comprises multiple virtual machines (VMs) and/or container sets 1402-1, 1402-2, ... 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, ... 1410-L running on respective ones of the VMs/container sets 1402-1, 1402-2, ... 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, ... 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for device failure prediction using filter-based feature selection and a conformal prediction framework as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, devices, features, classification algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to implement an analytics platform responsible for managing a plurality of devices in an information technology infrastructure, the analytics platform being configured to perform steps of:
   obtaining monitoring data for the plurality of devices in the information technology infrastructure, the monitoring data comprising a plurality of features;
   determining two or more rankings of the plurality of features using two or more filter-based feature selection algorithms;
   generating an overall feature ranking for the plurality of features using a multi-criteria decision analysis method that integrates the two or more ranking of the plurality of features;
   selecting a subset of the plurality of features based at least in part on the overall feature ranking for the plurality of features;
   generating, utilizing at least a first machine learning algorithm in a machine learning system implemented by the processor and the memory of the at least one processing device, a failure prediction for each of the plurality of devices, wherein each of the failure predictions is generated using at least one classifier that takes as input the selected subset of the plurality of features, and wherein each of the failure predictions comprises a forecast value characterizing likelihood of one or more of the plurality of devices failing within a designated time frame;
   applying a conformal prediction framework to the generated failure predictions, utilizing at least a second machine learning algorithm in the machine learning system implemented by the processor and the memory of the at least one processing device, to obtain confidence measures indicating a quality of each of the generated failure predictions and credibility measures indicating a quality of the monitoring data obtained for each of the plurality of devices;
   selecting at least a given one of the plurality of devices for remediation based at least in part on (i) a given forecast value of a given one of the generated failure predictions for the given device; (ii) a given one of the confidence measures indicating the quality of the given generated failure prediction for the given device; and (iii) a given one of the credibility measures indicating the quality of the monitoring data obtained for the given device; and
   prior to failure of the given device, in order to reduce at least one of data unavailability and data loss associated with failure of the given device, proactively migrating one or more workloads from the given device to one or more other ones of the plurality of devices in the information technology infrastructure and applying one or more fixes to one or more hardware components of the given device predicted to fail within the designated time frame.

2. The apparatus of claim 1 wherein the two or more filter-based feature selection algorithms comprise two or more of: a two sample t-test (T-TEST) algorithm; a Wilcoxon rank-sum (WRS) algorithm; a max-relevance min-redundancy (MRMR) algorithm; a mutual information maximization (MIM) algorithm; a mutual information feature selection (MIFS) algorithm; a joint mutual information (JMI) algorithm; a double input symmetrical relevance (DISR) algorithm; a conditional mutual information maximization (CMIM) algorithm; an interaction capping (ICAP) algorithm; and a conditional infomax feature extraction (CIFE) algorithm.

3. The apparatus of claim 1 wherein the multi-criteria decision analysis algorithm comprises a Technique for Order of Preference by Similarity to Ideal Solution (TOPSIS) multi-criteria decision analysis algorithm.

4. The apparatus of claim 1 wherein integrating the two or more rankings of the plurality of features utilizing the multi-criteria decision analysis algorithm comprises:
   performing vector normalization for each of the two or more rankings of the plurality of features;
   calculating, for each of the plurality of features across the two or more rankings of the plurality of features, distances from an ideal best ranking value and an ideal worst ranking value; and
   calculating, for each of the plurality of features across the two or more rankings of the plurality of features, a performance score based at least in part on the distances from the ideal best ranking value and the ideal worst ranking value.

5. The apparatus of claim 1 wherein selecting the subset of the plurality of features comprises calculating performance scores for each of the plurality of features across the two or more ranking of the plurality of features and selecting a designated number of the plurality of features having the highest calculated performance scores.

6. The apparatus of claim 1 wherein the at least one classifier comprises at least one of: a support vector machine (SVM) classifier; a random forest (RF) classifier; a decision tree (DT) classifier; a linear discriminant analysis (LDA) classifier; a Naïve Bayes (NB) classifier; a fuzzy logic (FL) classifier; and a k nearest neighbor (KNN) classifier.

7. The apparatus of claim 1 wherein applying the conformal prediction framework comprises utilizing inductive conformal prediction (ICP) with an incremental stochastic gradient descent (SGD) machine learning algorithm.

8. The apparatus of claim 1 wherein the given device comprises a storage device.

9. The apparatus of claim 8 wherein:
migrating the one or more workloads from the given device to the one or more other ones of the plurality of devices in the information technology infrastructure comprises backing up data from the storage device to another storage device in the information technology infrastructure; and
applying the one or more fixes to the one or more hardware components of the given device predicted to fail within the designated time frame comprises at least one of:
applying a file system check to the storage device; and
replacing the storage device with another storage device.

10. The apparatus of claim 1 wherein the given device comprises a server.

11. The apparatus of claim 10 wherein:
migrating the one or more workloads from the given device to the one or more other ones of the plurality of devices in the information technology infrastructure comprises migrating one or more applications hosted on the server to another server in the information technology infrastructure; and
applying the one or more fixes to the one or more hardware components of the given device predicted to fail within the designated time frame comprises replacing at least one of one or more hardware components of the server.

12. A computer program product comprising a non-transitory processor-readable storage medium having stored therein program code of one or more software programs, wherein the program code when executed by at least one processing device implementing an analytics platform responsible for managing a plurality of devices in an information technology infrastructure, causes the at least one processing device to perform steps of:
obtaining monitoring data for the plurality of devices in the information technology infrastructure, the monitoring data comprising a plurality of features;
determining two or more rankings of the plurality of features using two or more filter-based feature selection algorithms;
generating an overall feature ranking for the plurality of features using a multi-criteria decision analysis method that integrates the two or more ranking of the plurality of features;
selecting a subset of the plurality of features based at least in part on the overall feature ranking for the plurality of features;
generating, utilizing at least a first machine learning algorithm in a machine learning system implemented by the at least one processing device, a failure prediction for each of the plurality of devices, wherein each of the failure predictions is generated using at least one classifier that takes as input the selected subset of the plurality of features, and wherein each of the failure predictions comprises a forecast value characterizing likelihood of one or more of the plurality of devices failing within a designated time frame;
applying a conformal prediction framework to the generated failure predictions, utilizing at least a second machine learning algorithm in the machine learning system implemented by the at least one processing device, to obtain confidence measures indicating a quality of each of the generated failure predictions and credibility measures indicating a quality of the monitoring data obtained for each of the plurality of devices;
selecting at least a given one of the plurality of devices for remediation based at least in part on (i) a given forecast value of a given one of the generated failure predictions for the given device; (ii) a given one of the confidence measures indicating the quality of the given generated failure prediction for the given device; and (iii) a given one of the credibility measures indicating the quality of the monitoring data obtained for the given device; and
prior to failure of the given device, in order to reduce at least one of data unavailability and data loss associated with failure of the given device, at proactively migrating one or more workloads from the given device to one or more other ones of the plurality of devices in the information technology infrastructure and applying one or more fixes to one or more hardware components of the given device predicted to fail within the designated time frame.

13. The computer program product of claim 12 wherein the multi-criteria decision analysis algorithm comprises a Technique for Order of Preference by Similarity to Ideal Solution (TOPSIS) multi-criteria decision analysis algorithm.

14. The computer program product of claim 12 wherein applying the conformal prediction framework comprises utilizing inductive conformal prediction (ICP) with an incremental stochastic gradient descent (SGD) machine learning algorithm.

15. The computer program product of claim 12 wherein the given device comprises a storage device, and wherein:
migrating the one or more workloads from the given device to the one or more other ones of the plurality of devices in the information technology infrastructure comprises backing up data from the storage device to another storage device in the information technology infrastructure; and
applying the one or more fixes to the one or more hardware components of the given device predicted to fail within the designated time frame comprises at least one of:
applying a file system check to the storage device; and
replacing the storage device with another storage device.

16. A method performed by an analytics platform responsible for managing a plurality of devices in an information technology infrastructure, the method comprising:
obtaining monitoring data for the plurality of devices in the information technology infrastructure, the monitoring data comprising a plurality of features;
determining two or more rankings of the plurality of features using two or more filter-based feature selection algorithms;
generating an overall feature ranking for the plurality of features using a multi-criteria decision analysis method that integrates the two or more ranking of the plurality of features;
selecting a subset of the plurality of features based at least in part on the overall feature ranking for the plurality of features;
generating, utilizing at least a first machine learning algorithm in a machine learning system, a failure prediction for each of the plurality of devices, wherein each of the failure predictions is generated using at least one classifier that takes as input the selected subset of the plurality of features, and wherein each of the failure predictions comprises a forecast value characterizing likelihood of one or more of the plurality of devices failing within a designated time frame;

applying a conformal prediction framework to the generated failure predictions, utilizing at least a second machine learning algorithm in the machine learning system, to obtain confidence measures indicating a quality of each of the generated failure predictions and credibility measures indicating a quality of the monitoring data obtained for each of the plurality of devices;

selecting at least a given one of the plurality of devices for remediation based at least in part on (i) a given forecast value of a given one of the generated failure predictions for the given device; (ii) a given one of the confidence measures indicating the quality of the given generated failure prediction for the given device; and (iii) a given one of the credibility measures indicating the quality of the monitoring data obtained for the given device; and prior to failure of the given device, in order to reduce at least one of data unavailability and data loss associated with failure of the given device, proactively migrating one or more workloads from the given device to one or more other ones of the plurality of devices in the information technology infrastructure and applying one or more fixes to one or more hardware components of the given device predicted to fail within the designated time frame;

wherein the method is performed by at least one processing device comprising a processor coupled to a memory, the at least one processing device implementing the analytics platform and the machine learning system.

17. The method of claim 16 wherein the multi-criteria decision analysis algorithm comprises a Technique for Order of Preference by Similarity to Ideal Solution (TOPSIS) multi-criteria decision analysis algorithm.

18. The method of claim 16 wherein applying the conformal prediction framework comprises utilizing inductive conformal prediction (ICP) with an incremental stochastic gradient descent (SGD) machine learning algorithm.

19. The method of claim 16 wherein the given device comprises a storage device, and wherein:

migrating the one or more workloads from the given device to the one or more other ones of the plurality of devices in the information technology infrastructure comprises backing up data from the storage device to another storage device in the information technology infrastructure; and applying the one or more fixes to the one or more hardware components of the given device predicted to fail within the designated time frame comprises at least one of:

applying a file system check to the storage device; and replacing the storage device with another storage device.

* * * * *